United States Patent
Lee et al.

(10) Patent No.: US 12,063,268 B2
(45) Date of Patent: Aug. 13, 2024

(54) METHOD AND APPARATUS FOR LINKING MULTIPLE SERVICE IN DISTRIBUTED SERVER CLUSTER

(71) Applicant: TMAXSOFT CO., LTD., Gyeonggi-do (KR)

(72) Inventors: Chung Chun Lee, Seoul (KR); Chan Pyo Hong, Gyeonggi-do (KR)

(73) Assignee: TMAXSOFT CO., LTD., Gyeonggi-do (KR)

( * ) Notice: Subject to any disclaimer, the term of this patent is extended or adjusted under 35 U.S.C. 154(b) by 0 days.

(21) Appl. No.: 18/175,792

(22) Filed: Feb. 28, 2023

(65) Prior Publication Data
US 2024/0223646 A1    Jul. 4, 2024

(30) Foreign Application Priority Data
Jan. 3, 2023  (KR) .......................... 10-2023-0000811

(51) Int. Cl.
*H04L 67/1008* (2022.01)
(52) U.S. Cl.
CPC ................................ *H04L 67/1008* (2013.01)
(58) Field of Classification Search
CPC ................................................... H04L 67/1008
See application file for complete search history.

(56) References Cited

U.S. PATENT DOCUMENTS

| | | | |
|---|---|---|---|
| 6,564,261 B1 * | 5/2003 | Gudjonsson | H04L 9/40 379/900 |
| 7,406,692 B2 | 7/2008 | Halpern et al. | |
| 8,281,033 B1 | 10/2012 | Riordan et al. | |
| 10,127,122 B2 | 11/2018 | Somogyi et al. | |
| 2017/0093645 A1 * | 3/2017 | Zhong | H04L 41/12 |

* cited by examiner

*Primary Examiner* — Adnan M Mirza
(74) *Attorney, Agent, or Firm* — Umberg Zipser LLP

(57) ABSTRACT

A method for linking multiple services in a distributed server cluster system, comprising: receiving a processing request for a second service from a first server which belongs to a first server cluster to which a first service is distributed, wherein the processing request includes identification information for a transaction generated by the first server and request data for processing one or more services according to a client device request, processing a task for the second service according to the received processing request, determining a service to be processed next to the second service based on the request data, determining whether there is the first server having a history which participates in the transaction among servers of a server cluster to which the determined service is distributed, and delivering the processing request for the determined service to the first server when the first server having the history participates in the transaction.

13 Claims, 12 Drawing Sheets

METHOD AND APPARATUS FOR LINKING MULTIPLE SERVICE IN DISTRIBUTED SERVER CLUSTER

CROSS-REFERENCE TO RELATED APPLICATIONS

This application claims priority to and the benefit of Korean Patent Application No. 10-2023-0000811 filed in the Korean Intellectual Property Office on Jan. 3, 2023, the entire contents of which are incorporated herein by reference.

TECHNICAL FIELD

The present disclosure relates a method and apparatus for linking multiple services in a distributed server cluster system.

BACKGROUND ART

Under a lot of company system environments that provide various application services, as a scale of an application becomes larger, an administrator constructs a distributed server cluster system in which multiple servers are configured as a cluster to distribute a load to each server.

When there is a request for a service distributed to each server cluster in a client device, the service distributed to each server cluster can be called. To this end, by using a scheme such as round robin or random, any one server of one or more servers which belong to each server cluster is called to process the service according to a turn or a random order of the server, to enabling load distribution.

However, in a global transaction in which multiple services are processed between multiple server clusters in one transaction, servers which belong to the server clusters participate in the transaction according to the above-described scheme, so a large number of servers and session connections are achieved in a database connected to each server cluster. As a result, the total number of servers which participate in the transaction unnecessarily increases, so a database session usage amount increase. Moreover, since a transaction administrator who administrates the global transaction also performs a transaction administration through mutual communication with multiple servers, a time required for processing the transaction increases.

Therefore, a method and an apparatus for linking multiple services in a distributed server cluster system for minimizing a required time at the time of processing the database session usage amount and the transaction while enhancing a processing performance of the global transaction are required.

SUMMARY OF THE INVENTION

The present disclosure has been made in an effort to provide a method and an apparatus for linking multiple services in a distributed server cluster system.

However, technical objects of the present disclosure are not restricted to the technical object mentioned above. Other unmentioned technical objects will be apparently appreciated by those skilled in the art by referencing to the following description.

In order to solve the foregoing object, an exemplary embodiment of the present disclosure discloses a method for linking multiple services in a distributed server cluster system, which is performed by a first computing device, the method comprising: receiving a processing request for a second service from a first server which belongs to a first server cluster to which a first service is distributed, wherein the processing request includes identification information for a transaction generated by the first server and request data for processing one or more services according to a request of a client device, processing a task for the second service according to the received processing request, determining a service to be processed next to the second service based on the request data, determining whether there is the first server having a history which participates in the transaction among servers of a server cluster to which the determined service is distributed and delivering the processing request for the determined service to the first server when there is the first server having the history which participates in the transaction.

Alternatively, wherein the first server is a server that receives requests for the one or more services from the client device, starts the transaction, and generates the identification information of the transaction.

Alternatively, wherein the request data includes a query statement for sequentially processing the one or more services, and the determining of the service to be processed next to the second service based on the request data is determining the service to be processed next to the second service by using the query statement.

Alternatively, wherein when the transaction is generated by the first server, detailed information for the servers which belong to one or more server clusters to which the one or more services are distributed is shared through the first server, and the detailed information includes address information for the servers which belong to the one or more server clusters.

Alternatively, wherein the identification information of the transaction includes the address information for the first server, and the determining of whether there is the first server having the history which participates in the transaction among the servers of the server cluster to which the determined service is distributed includes determining whether there is address information which matches the address information for the first server among the address information for the servers which belong to the one or more server clusters, and determining the first server as a server which is to process the second service when there is the address information which matches the address information for the first server.

Alternatively, the method further comprising: determining that the first server having the history which participates in the transaction is not present when there is no address information which matches the address information for the first server.

Alternatively, the method further comprising: determining a server which is to process the determined service by using the identification information of the transaction when the first server having the history which participates in the transaction is not present; and delivering the processing request for the determined service to the determined server.

Alternatively, wherein the determining of the server which is to process the determined service by using the identification information of the transaction includes acquiring an index value by hashing the identification information of the transaction, determining a first value indicating a turn of the server which is to process the determined service based on the acquired index value and the number of servers which belong to the server cluster to which the determined service is distributed, and determining a server having the first value as a turn among the servers which belong to the server cluster to which the determined service is distributed as the server which is to process the determined service.

In order to solve the foregoing object, an exemplary embodiment of the present disclosure discloses a method for linking multiple services in a distributed server cluster system, which is performed by a second computing device, the method comprising: receiving requests for one or more services from a client device, wherein the request includes request data for processing the one or more services, processing a first service distributed to the second computing device according to the received request by generating a transaction for processing the one or more services, determining a service to be processed next to the processed first service based on the request data, and delivering a processing request for the determined service to a second server having a history which participates in the transaction among servers of a server cluster to which the determined service is distributed.

Alternatively, wherein the request data includes a query statement for sequentially processing the one or more services, and the determining of the service to be processed next to the first service based on the request data is determining the service to be processed next to the first service by using the query statement.

Alternatively, the method further comprising: generating identification information for the generated transaction after generating the transaction, and making address information of the second computing device be included in the generated identification information.

Alternatively, wherein the delivering of the processing request for the determined service to the second server having the history which participates in the transaction among the servers of the server cluster to which the determined service is distributed includes acquiring an index value by hashing the identification information of the transaction, determining a first value indicating a turn of the server which is to process the determined service based on the acquired index value and the number of servers which belong to the server cluster to which the determined service is distributed, and delivering a processing request for the determined service to a server having the first value as a turn among the servers which belong to the server cluster to which the determined service is distributed.

Alternatively, wherein the processing request includes the request data and the identification information of the transaction including the address information of the second computing device.

In order to solve the foregoing object, an exemplary embodiment of the present disclosure discloses a computer program stored in a computer-readable storage medium, wherein the computer program executes the following operations for linking multiple services in a distributed server cluster system when the computer program is executed by one or more processors, the operations comprising: an operation of receiving a processing request for a second service from a first server which belongs to a first server cluster to which a first service is distributed, wherein the processing request includes identification information for a transaction generated by the first server and request data for processing one or more services according to a request of a client device, an operation of processing a task for the second service according to the received processing request, an operation of determining a service to be processed next to the processed second service based on the request data, an operation of determining whether there is the first server having a history which participates in the transaction among servers of a server cluster to which the determined service is distributed, and an operation of delivering the processing request for the determined service to the first server when there is the first server having the history which participates in the transaction.

In order to solve the foregoing object, an exemplary embodiment of the present disclosure discloses a computing device for linking multiple services in a distributed server cluster system, comprising: at least one processor, and a memory, wherein at least one processor is configured to receive a processing request for a second service from a first server which belongs to a first server cluster to which a first service is distributed, wherein the processing request includes identification information for a transaction generated by the first server and request data for processing one or more services according to a request of a client device, process a task for the second service according to the received processing request, determine a service to be processed next to the processed second service based on the request data, determine whether there is the first server having a history which participates in the transaction among the servers of the server cluster to which the determined service is distributed, and deliver the processing request for the determined service to the first server when there is the first server having the history which participates in the transaction.

According to some exemplary embodiments of the present disclosure, the present disclosure can provide a method and an apparatus for linking multiple services in a distributed server cluster system, which efficiently enhance a transaction processing capability.

In the present disclosure, a server having a history which participates in the transaction at the time of processing a global transaction continuously processes a distributed service, so an availability and a performance of a global transaction can be enhanced while minimizing the number of servers which process a service and the number of database sessions connected to the server.

In the present disclosure, when multiple service requests are delivered to each server cluster in one transaction, one server performs the service processing according to the multiple service requests to minimize a database session usage amount and a transaction processing communication amount, and enhance a transaction processing speed.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

DETAILED DESCRIPTION

Figure 1:
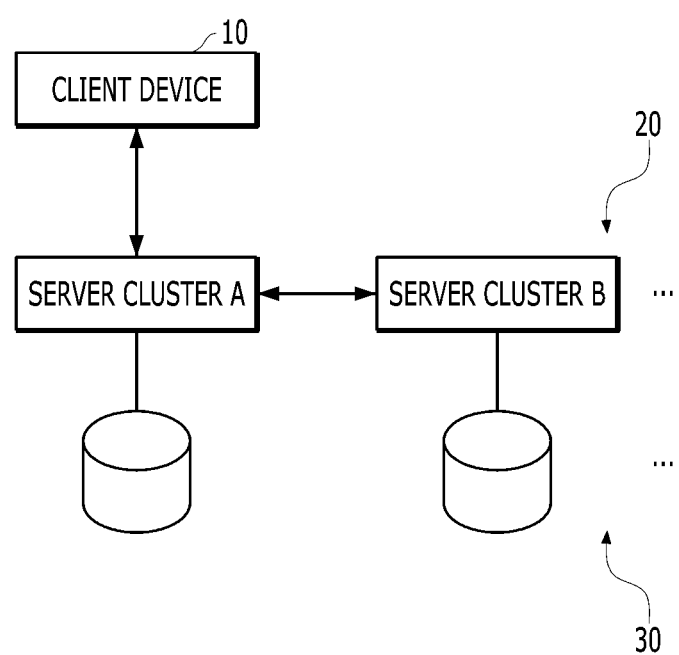
FIG. 1 is a configuration diagram of an exemplary system for linking multiple services in a distributed server cluster system according to an exemplary embodiment of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, it shall be understood that a term "include" and/or "including" means that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, such implementation decisions should not be interpreted as causing a departure from the scope of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, 'transaction' may mean a task unit that is performed in order to change a state of a database. Here, the task unit may be determined by a SQL query statement for processing one or more services.

In the present disclosure, 'service' as a MicroService Architecture (MSA) based service may mean a service which is divided into small-unit services which are singly executable and are independently operated, and provided.

In the present disclosure, 'task' may mean an execution unit for performing a specific action for a request target. Further, in various exemplary embodiments of the present disclosure, the task as a database task may mean, for example an execution (or processing) action for reading, writing, or searching specific data stored in the database.

FIG. 1 is a configuration diagram of an exemplary system for linking multiple services in a distributed server cluster system according to an exemplary embodiment of the present disclosure.

Referring to FIG. 1, the corresponding system may include a client device 10 that requests a service, a plurality of server clusters 20 to which a plurality of services are distributed, and a database 30 of each server cluster.

Components illustrated in FIG. 1 are exemplary and additional components may exist or some of the components may be omitted.

According to some exemplary embodiments of the present disclosure, the client device 10 and the plurality of server clusters 20 may mutually transmit and receive data for linking multiple services in a distributed server cluster system according to some exemplary embodiments of the present disclosure through a wireless communication network.

The client device 10 may include a predetermined electronic device having connectivity with a personal computer (PC), a laptop computer, a workstation, a user terminal, and/or the network for requesting the service. Further, the client device 10 may include a predetermined server implemented by at least one of agent, application programming interface (API), and plug-in. In addition, the client device 10 may include an application source and/or a client application.

Specifically, the client device 10 may deliver the request for the service to a server cluster which is appropriate for processing the service. Here, the request may include request data, and the request data may include a query statement for processing at least one requested service. For example, the query statement may be an SQL statement or an SQL query statement expressed by a structural query language (SQL).

According to some exemplary embodiments of the present disclosure, the client device 10 may be a predetermined entity which includes a control unit, a storage unit (a memory and a persistent storage medium), and a communication unit to process, store, and transceive predetermined data.

In the present disclosure, the control unit may be constituted by one or more cores, and may include a predetermined type of processor for delivering the request for the service by executing instructions stored in a memory, such as a central processing unit (CPU), a micro controller unit (MCU), etc., of the client device 10. The processor may deliver the request for the service according to some exemplary embodiments of the present disclosure by reading a computer program stored in the memory.

The storage unit in the present disclosure may store a program for an operation of the control unit, and also temporarily or persistently store input/output data. The storage unit may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The storage unit may be operated by the control of the control unit. Further, in the present disclosure, the memory and the storage unit may be used interchangeably with each other.

In the present disclosure the communication unit may connect the client device 10 to communicate with various devices. Specifically, the communication unit is connected to an external device to transmit and receive data for delivering the request for the service.

Each of the plurality of server clusters 20 may include a plurality of servers to which the service is distributed and which is used for providing the distributed service. Each of the plurality of servers according to the exemplary embodiment of the present disclosure may be a web application server (WAS) that start and/or administrates the transaction in order to process the requested service, but is not limited thereto.

The plurality of server clusters 20 will be described in mode detail with reference to FIG. 2.

Figure 2:
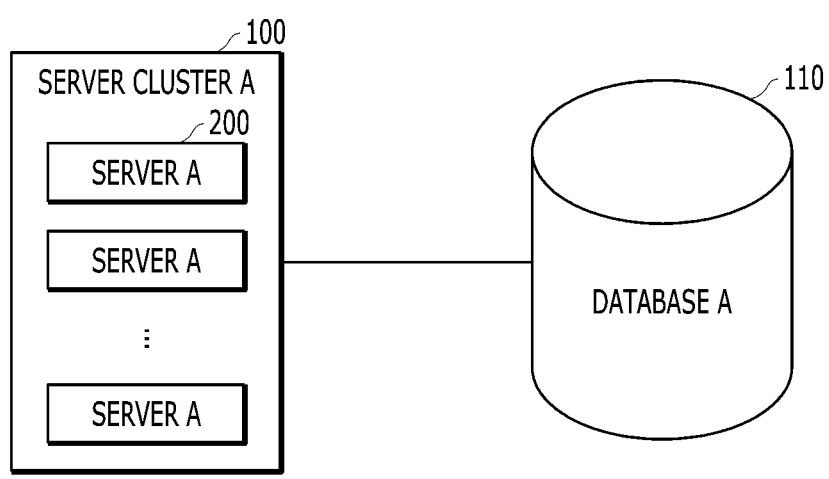
FIG. 2 is a configuration diagram of an exemplary server cluster according to the exemplary embodiment of the present disclosure.

FIG. 2 is a configuration diagram of an exemplary server cluster according to the exemplary embodiment of the present disclosure. In the presented exemplary embodiment, any server cluster (hereinafter, referred to as 'server cluster A 100') among the plurality server clusters 20 will be described.

Referring to FIG. 2, server cluster A 100 may include a plurality of servers for processing a task regarding at least one first service (hereinafter, referred to as 'first service) distributed to server cluster A 100. Database A 110 related to the first service may be provided in server cluster A 100.

Any one server (hereinafter, referred to as server A 200) among the plurality of servers included in server cluster A 100 may include any type of computer system or computer device such as a computer, a digital processor, a hand-held device, or a device controller for processing the task for the first service.

Specifically, when a request for one or more services is received from the client device 10, server A 200 may generate a transaction for processing tasks for one or more services according to the received request. Server A 200 may generate identification information (i.e., ID) of the transaction for distinguishing the generated transaction at the time of generating the transaction.

When the transaction is processed through mutual communication between the server clusters to which one or more services are distributed in one transaction in order to process the tasks for one or more services, the transaction may be a global transaction.

Server A 200 is shared in advance in order to process the tasks for one or more services in one transaction as such, detailed information for the service distributed to each server or each server cluster may be used. Here, the detailed information for the service distributed to each server or each server cluster may include identification information of the distributed service, a name, and/or address information of the server cluster (or the plurality of servers included in the server cluster) to which the service is distributed, but is not limited thereto. For example, when the service is distributed, each server cluster may generate the detailed information for the distributed service, and share the generated detailed information with each server cluster. Through this, server A 200 may determine to which server or to which server cluster each service is distributed.

Each server cluster may sequentially process one or more services based on request data received from the client device 10.

Specifically, server A 200 may process the task for the first service distributed to server A 200 based on the request data, and determine a service to be processed next to the processed first service among one or more services. In other words, server A 200 may perform a session connection to database A 110 in order to process the task for the first service, and performs the task for the first service in relation to database A 110 which is session-connected. Subsequently, server A 200 may determine a service to be processed next to the first service according to query statement logic for sequentially processing at least one service included in the request data. For example, it is assumed that the request data includes a query statement for sequentially processing a second service after the first service. In this case, server A 200 may determine the service to be processed next to the first service as the second service based on the request data.

Server A 200 may determine any one server among servers which belong to the server cluster to which the second service is distributed as the server which is to process the second server by using the identification information of the transaction, and call (or request) the determined server to process the task for the second service. The call may include the request data and the identification information of the transaction.

In various exemplary embodiments, it is assumed that the request data includes a query statement for processing the second service, and then, processing the second service again. In this case, server A 200 may call the server having the history which participates in the transaction among the servers which belong to the server cluster to which the second service is distributed to process the task for the second service by using the identification information of the transaction.

In various exemplary embodiments of the present disclosure, when the transaction is started (i.e., when the transaction is generated), server A 200 may deliver a notification message (hereinafter, referred to as 'first notification message') for notifying the start of the transaction to each server cluster, and when the transaction is completed, server A 200 may deliver a notification message (hereinafter, referred to as 'second notification message') for notifying the end of the transaction to each server cluster. Further, server A 200 requests a commit or rollback to each server cluster which participates in the transaction, so the server clusters may simultaneously perform the commit or rollback. Here, the completion of the transaction may mean a state in which task processing of all server clusters which participate in the corresponding transaction is completed.

According to some exemplary embodiments of the present disclosure, server A 200 may be a predetermined entity which includes a processor, a storage unit (a memory and a persistent storage medium), and a communication unit to process, store, and transceive predetermined data.

In the present disclosure, the processor may be constituted by one or more cores and may include any type of processors for performing an operation for the transaction for processing at least one service by executing instructions stored in the memory, which include a central processing unit (CPU), a general purpose graphics processing unit (GPGPU), a tensor processing unit (TPU), a graphic processing unit (GPU), and the like of the computing device. The processor may perform the operation for the transaction for processing at least one service according to the exemplary embodiment of the present disclosure by reading the computer program stored in the memory.

In the present disclosure, the memory may store a program for the operation of the processor and temporarily or persistently store input/output data. The memory may include at least one type of storage medium of a flash memory type, a hard disk type, a multimedia card micro type, a card type memory (e.g., an SD or XD memory), a RAM, an SRAM, a ROM, an EEPROM, a PROM, a magnetic memory, a magnetic disk, and an optical disk. The memory may be operated by control by the processor. Further, in the present disclosure, the memory and the storage unit may be used interchangeably with each other.

The storage unit according to the present disclosure may store various data used for the transaction for processing at least one service.

In the present disclosure, the communication unit may connect server A 200 to communication with various devices. Specifically, the communication unit may transmit and receive data to and from any server (e.g., server B 300 to be described below) which belongs to the client device 10 or another server cluster (e.g., server cluster B 120 to be described below).

Figure 3:
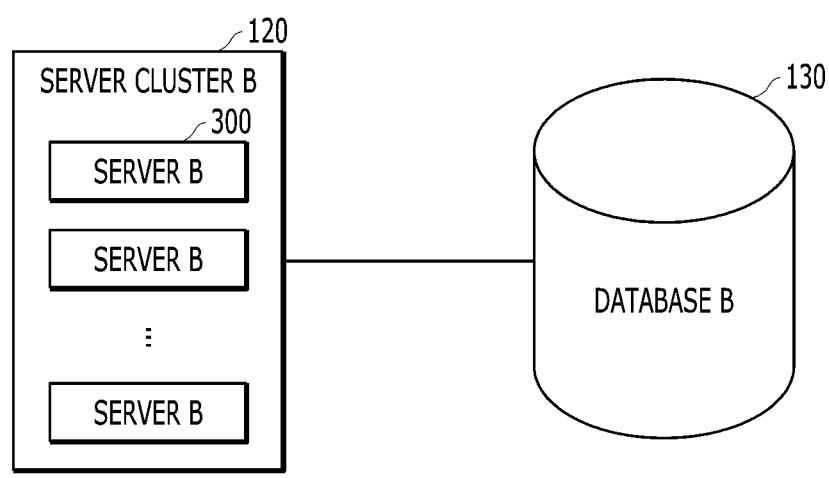
FIG. 3 is a configuration diagram of an exemplary server cluster according to some exemplary embodiments of the present disclosure.

FIG. 3 is a configuration diagram of an exemplary server cluster according to some exemplary embodiments of the present disclosure. In the presented exemplary embodiment, any another server cluster (hereinafter, referred to as 'server cluster B 120') among the plurality server clusters 20 will be described. For example, server cluster B 120 may be called from the first server 200 to which the second service among one or more services is distributed, and which is used for processing the second service.

Referring to FIG. 3, server cluster B 120 may include a plurality of servers for processing a task regarding at least one second service (hereinafter, referred to as 'second service') distributed to server cluster B 120. Database B 130 related to the second service may be provided in server cluster B 120.

Any server (hereinafter, referred to as server B 300) among the plurality of servers included in server cluster B 120 may include any type of computer system or computer device such as a computer, a digital processor, a hand-held device, or a device controller for processing the task for the second service.

Specifically, server B 300 may process the task for the second service according to the request (i.e., call) of server A 200, and determine the service to be processed next of the processed second service. The call of server A 200 may include the identification information of the transaction and the request data. In other words, server B 300 may perform a session connection to database B 130 in order to process the task for the second service, and performs the task for the second service in relation to database B 130 which is session-connected. Subsequently, server B 300 may determine a service to be processed next to the second service according to query statement logic for sequentially processing at least one service included in the request data. For example, it is assumed that the request data includes a query statement for sequentially processing the first service after the second service. In this case, server B 300 may determine the service to be processed next the second service as the first service based on the request data.

Server B 300 may determine the server having the history which participates in the transaction among the servers which belong to server cluster A 100 to which the first service is distributed by using the identification information of the transaction, and call the determined server to process the task for the first service.

In various exemplary embodiments of the present disclosure, when the transaction is started, server B 300 may receive a first notification message for notifying the start of the transaction from server A 200 that starts the transaction. In this case, server B 300 may recognize the service request received from each server after the first notification message as the task of the global transaction.

When the transaction is completed, server B 300 may receive a second notification message for notifying the end of the transaction from server A 200. In this case, server B 300 may prepare for the commit or rollback. When the request for the commit or rollback is received from server A 200, server B 300 may process the commit or rollback.

According to some exemplary embodiments of the present disclosure, server B 300 may be any entity which includes a processor, a storage unit (a memory and a persistent storage medium), and a communication unit to process, store, and transceive predetermined data.

In the present disclosure, the processor may be constituted by one or more cores and may include any type of processors for processing the task for the service request by executing instructions stored in the memory, which include a central processing unit (CPU), a general purpose graphics processing unit (GPGPU), a tensor processing unit (TPU), a graphic processing unit (GPU), and the like of the computing device. The processor may perform the operation for the transaction for processing at least one service according to the exemplary embodiment of the present disclosure by reading the computer program stored in the memory.

In the present disclosure, the memory may store a program for the operation of the processor and temporarily or persistently store input/output data. The memory may include at least one type of storage medium of a flash memory type, a hard disk type, a multimedia card micro type, a card type memory (e.g., an SD or XD memory), a RAM, an SRAM, a ROM, an EEPROM, a PROM, a magnetic memory, a magnetic disk, and an optical disk. The memory may be operated by control by the processor. Further, in the present disclosure, the memory and the storage unit may be used interchangeably with each other.

The storage unit according to the present disclosure may store various data used for performing the operation for the transaction for processing at least one service.

In the present disclosure the communication unit may connect server B 300 to communication with various devices. Specifically, the communication unit may transmit and receive data to and from any server (e.g., server A 200) which belongs to another server cluster (e.g., server cluster A 100).

Hereinafter, server A 200 that starts the transaction will be described in more detail with reference to FIG. 4.

Figure 4:
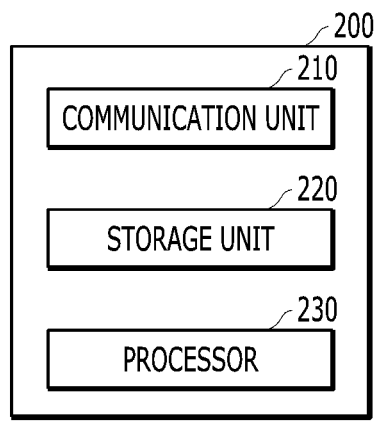
FIG. 4 is a block diagram of a server according to the exemplary embodiment of the present disclosure.

FIG. 4 is a block diagram of a server according to the exemplary embodiment of the present disclosure. In the presented exemplary embodiment, server A 200 which belongs to server cluster A 100 will be described. The configuration of server A 200 illustrated in FIG. 4 is only an example illustrated through simplification. In an exemplary embodiment of the present disclosure, server A 200 may include other components for performing a computing environment of server A 200 and only some of the disclosed components may constitute server A 200.

Server A 200 may include a communication unit 210, a storage unit 220, and a processor 230. However, components described above are not required in implementing server A 200 and server A 200 may thus have components more or less than components listed above. Here, respective components may be configured as separate chips, modules, or devices and may be included in one device.

The communication unit 210 according to the exemplary embodiment of the present disclosure may include any type of wired/wireless Internet module for network connection. In the present exemplary embodiment, the communication unit 210 may use various types of known wired networks and wireless networks.

According to some exemplary embodiments of the present disclosure, the communication unit 210 connects server A 200 to communicate with an external device. The communication unit 210 may receive the request for one or more services from the client device 10 by using wired/wireless communication. The communication unit 210 may deliver the first notification message for notifying the start of the transaction or the second notification message for notifying the end of the transaction to each server cluster.

The communication unit 210 may deliver the processing request for the second service to server B 300 which belongs to server cluster B 120, or receive the processing request for the first service from server B 300. Furthermore, the communication unit 210 may deliver a response to the request of the client device 10 to the client device 10.

According to the exemplary embodiment of the present disclosure, the storage unit 220 may store any type of information generated or determined by the processor 230 or any type of information received by the communication unit 210. According to some exemplary embodiments of the present disclosure, the storage unit 220 may store various data used for processing the transaction.

The storage unit 220 may include a memory and/or a persistent storage medium. The storage unit 220 may include at least one type of storage medium of a flash memory type, a hard disk type, a multimedia card micro type, a card type memory (e.g., an SD or XD memory), a RAM, an SRAM, a ROM, an EEPROM, a PROM, a magnetic memory, a magnetic disk, and an optical disk. Server A 200 may also operate in connection with a web storage performing a storing function of the storage unit 220 on the Internet. The description of the storage unit is just an example and the present disclosure is not limited thereto.

The processor 230 may be constituted by one or more cores and may include processors for data analysis and processing, which include a central processing unit (CPU), a general purpose graphics processing unit (GPGPU), a tensor processing unit (TPU), and the like of the computing device.

The processor 230 may read a computer program stored in the storage unit 220 to perform various operations for processing the transaction according to the exemplary embodiment of the present disclosure.

Specifically, the processor 230 may receive the request for processing one or more services from the client device 10. The received request may include the request data, and the request data may include a query statement for sequentially processing one or more services.

The processor 230 may generate the transaction for processing one or more services according to the received request, and generate identification information for the generated transaction. The identification information for the transaction may include address information of server A 200. For example, the processor 230 may include address information including information on an IP address and a port in the identification information of the transaction.

In some exemplary embodiments of the present disclosure, the processor 230 may deliver the first notification message for notifying the start of the transaction to each server cluster. The first notification message may include identification information of the global transaction.

The processor 230 may process the task for the first service distributed to server A 200 based on the request data included in the received request, and determine the service to be processed next to the first service.

In order to determine the service to be processed next, the processor 230 may use the query statement logic for sequentially processing one or more services included in the request data. For example, when the service to be processed after the first service is the second service, the processor 230 may determine the server cluster (i.e., server cluster B 120) to which the second service is distributed by using detailed information for the distributed service shared in advance, and determine the server which is to process the second service among the servers which belong to the determined server cluster.

In order to determine the server which is to process the second service, the processor 230 may acquire an index value of an integer by hashing the identification information of the transaction, and determine the server which is to process the second service by using the acquired index value.

In order to determine the server which is to process the second service, the processor 230 may determine a first value indicating a turn of server B which is to process the second service based on the acquired index values and the number of servers B which belong to server cluster B 120. For example, the processor 230 may determine a value acquired by dividing the index value by the number of servers B which belong to server cluster B 120 as the first value.

In some exemplary embodiments of the present disclosure, when the number of servers B which belong to server cluster B 120 is 3, the processor 230 may determine a value acquired by dividing the index value by '3' as the first value. The processor 230 may deliver the processing request for the second service to server B 300 having the determined first value (hereinafter, referred to as 'first value at a first time') as the turn. For example, the first time may mean a time of first acquiring the first value in order to determine server B which is to process the second service.

Unique identification information (i.e., ID) of the transaction is generated in one transaction, and all servers in the transaction share the identification information of the transaction, so the processor 230 may use the identification information of the transaction in order to determine the server having the history which participates in the transaction as the server which is to process the next service.

When the processing request for the second service is delivered again after the task for the second service is processed, the processor 230 may determine a first value (hereinafter, referred to as 'first value at a second time') indicating the turn of server B which is to process the second service again based on the index value and the number of servers B which belong to server cluster B 120 as described above. For example, the second time may mean a time of determining the first value after the first time in order to determine server B which is to process the second service again.

Since the identification information of the transaction is a value which is not changed in the transaction as described above, the first value at the second time may be a value equal to the first value at the first time. Therefore, the server having the first value at the second time as the turn may also be server B 300 having the history which participates in the transaction. In this case, the processor 230 may deliver the processing request for the second service to server B 300 again.

As such, in the present disclosure, when a processing request for a specific service is delivered to any server which belongs to a server cluster to which the specific service is distributed, and then the processing request for the same service is delivered again, the processing request is delivered to the server having the history which participates in the transaction, so the required time may be minimized at the time of processing the database session usage amount and the transaction, thereby enhancing the transaction processing performance.

In various exemplary embodiments of the present disclosure, it is assumed that two or more services (e.g., the second service and a third service) are distributed to server cluster B 120, and the third service is processed after the second service is processed by the query statement logic. In this case, the processor 230 may deliver the processing request for the second service to server B 300 of server cluster B 120 based on the above-described scheme. Subsequently, the processor 230 may determine the server cluster (i.e., server cluster B 120) to which the third service is distributed based on the request data, and deliver the processing request for the third service to server B 300 having the history which participates in the transaction in server cluster B 120 by using the identification information of the transaction. As such, the server having the history which participates in the transaction processes the task for the third service through a session already connected to the database to minimize the number of DB sessions generated in the transaction, and reduce the time required for processing the tasks for the service, thereby reducing resources required for processing the transaction.

Hereinafter, the server which participates in the transaction will be described in more detail with reference to FIG. 5.

Figure 5:
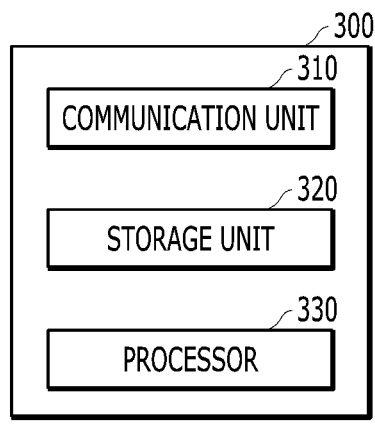
FIG. 5 is a block diagram of a server according to some exemplary embodiments of the present disclosure.

FIG. 5 is a block diagram of a server according to some exemplary embodiments of the present disclosure. In the presented exemplary embodiment, server B 300 which belongs to server cluster B 120 will be described. The configuration of server B 300 illustrated in FIG. 5 is only an example illustrated through simplification. In an exemplary embodiment of the present disclosure, server B 300 may include other components for performing a computing environment of server B 300 and only some of the disclosed components may constitute server B 300.

Server B 300 may include a communication unit 310, a storage unit 320, and a processor 330. However, components described above are not required in implementing server B 300 and server B 300 may thus have components more or less than components listed above. Here, respective components may be configured as separate chips, modules, or devices and may be included in one device.

The communication unit 310 network according to the exemplary embodiment of the present disclosure may include any type of wired/wireless Internet module for network connection. In the present exemplary embodiment, the communication unit 310 may use various types of known wired networks and wireless networks.

According to some exemplary embodiments of the present disclosure, the communication unit 310 connects server B 300 to communicate with the external device. The communication unit 310 may receive the processing request for the second service from server A 200 by using wired/wireless communication. Further, the communication unit 310 may deliver the processing request for the first service to server A 200, or deliver a processing request for another service to any server which belongs to a server cluster to which the corresponding service is distributed. Furthermore, the communication unit 310 may receive the first notification message for notifying the start of the transaction from server A 200, or receive the second notification message for notifying the end of the transaction.

According to the exemplary embodiment of the present disclosure, the storage unit 320 may store any type of information generated or determined by the processor 330 or any type of information received by the communication unit 310. According to some exemplary embodiments of the present disclosure, the storage unit 320 may store various data used for processing the transaction.

The storage unit 320 may include a memory and/or a persistent storage medium. The storage unit 320 may include at least one type of storage medium of a flash memory type, a hard disk type, a multimedia card micro type, a card type memory (e.g., an SD or XD memory), a RAM, an SRAM, a ROM, an EEPROM, a PROM, a magnetic memory, a magnetic disk, and an optical disk. Server B 300 may also operate in connection with a web storage performing a storing function of the storage unit 320 on the Internet. The description of the storage unit is just an example and the present disclosure is not limited thereto.

The processor 330 may be constituted by one or more cores and may include processors for data analysis and processing, which include a central processing unit (CPU), a general purpose graphics processing unit (GPGPU), a tensor processing unit (TPU), and the like of the computing device.

The processor 330 may read a computer program stored in the storage unit 320 to perform various operations for processing the transaction according to the exemplary embodiment of the present disclosure.

Specifically, when the transaction is started by server A 200, the processor 330 may receive the first notification message for notifying the start of the transaction from server A 200. The processor 330 that receives the first notification message may recognize the processing request for the second service received after the first notification message is received as the task of the global transaction.

The processor 330 may receive the processing request for the second service from server A 200, and process the task for the second service according to the received processing request. The processing request for the second service may include the identification information of the transaction generated by server A 200, and the request data as described above.

The processor 330 may determine the service to be processed next to the second service based on the request data, and determine the server which is to process the determined service among the servers of the server cluster to which the determined service is distributed by using the identification information of the transaction.

For example, it is assumed that the service to be processed next to the second service is the 'first service'. In this case, the processor 330 may determine whether there is the server having the history which participates in the transaction among the servers of the server cluster to which the first service is distributed by using the identification information of the transaction.

Since the identification information of the transaction includes address information for server A 200 which starts the transaction and to which the first service is distributed, the processor 330 may determine whether there is the server having the history which participates in the transaction by using the identification information of the transaction, and address information of servers which belong to the server cluster to each service is distributed, which is shared in advance.

Specifically, the processor 330 may determine whether there is address information which matches the address information included in the identification information of the transaction among the address information of the servers shared in advance with respect to the server cluster to which the determined service is distributed. In other words, the processor 330 may determine whether there is address information which matches the address information of server A 200.

When there is the address information which matches the address information included in the identification information of the transaction, the processor 330 may determine a server having the corresponding address information as the server which is to process the first service. The processor 330 may deliver the processing request for the determined service to the determined server (i.e., the server having the history which participates in the transaction) by using the address information included in the identification information of the transaction. Since the address information including the identification information of the transaction is the address information of server A 200 as described above, the processor 330 may deliver the processing request for the first service to server A 200 by using the address information of server A 200. As such, in the present disclosure, the processing request is delivered to the server having the history which participates in the transaction among the servers of the server cluster to which the specific service is distributed for the processing request for the specific service, so the resources required for the transaction processing may be reduced by minimizing the required time at the time of processing the database session usage amount and the transaction, thereby enhancing the available and the transaction processing capability of the distributed server cluster system.

When there is no address information which matches the address information included in the identification information of the transaction, the processor 330 may determine that there is no server having the history which participates in the transaction, and determine the server which is to process the determined service by using the identification information of the transaction.

In order to determine the server which is to process the service, the processor 330 may acquire the index value by hashing the identification information of the transaction, and determine the server which is to process the determined service by using the acquired index value as described above. When there is no server having the history which participates in the transaction, the index value acquired by hashing the identification information of the transaction may be used for determining the server which is to process the service. Moreover, the index value does not correspond to the address information included in the transaction ID (i.e., the corresponding server is not the server which starts the transaction), but may also be used for requesting the server having the history which participates in the transaction to process the same service (or distributed service). This will be described below in detail with reference to FIG. 10.

Hereinafter, a method for linking multiple services in the distributed server cluster system will be described in more detail with reference to FIGS. 6 to 11.

Figure 6:
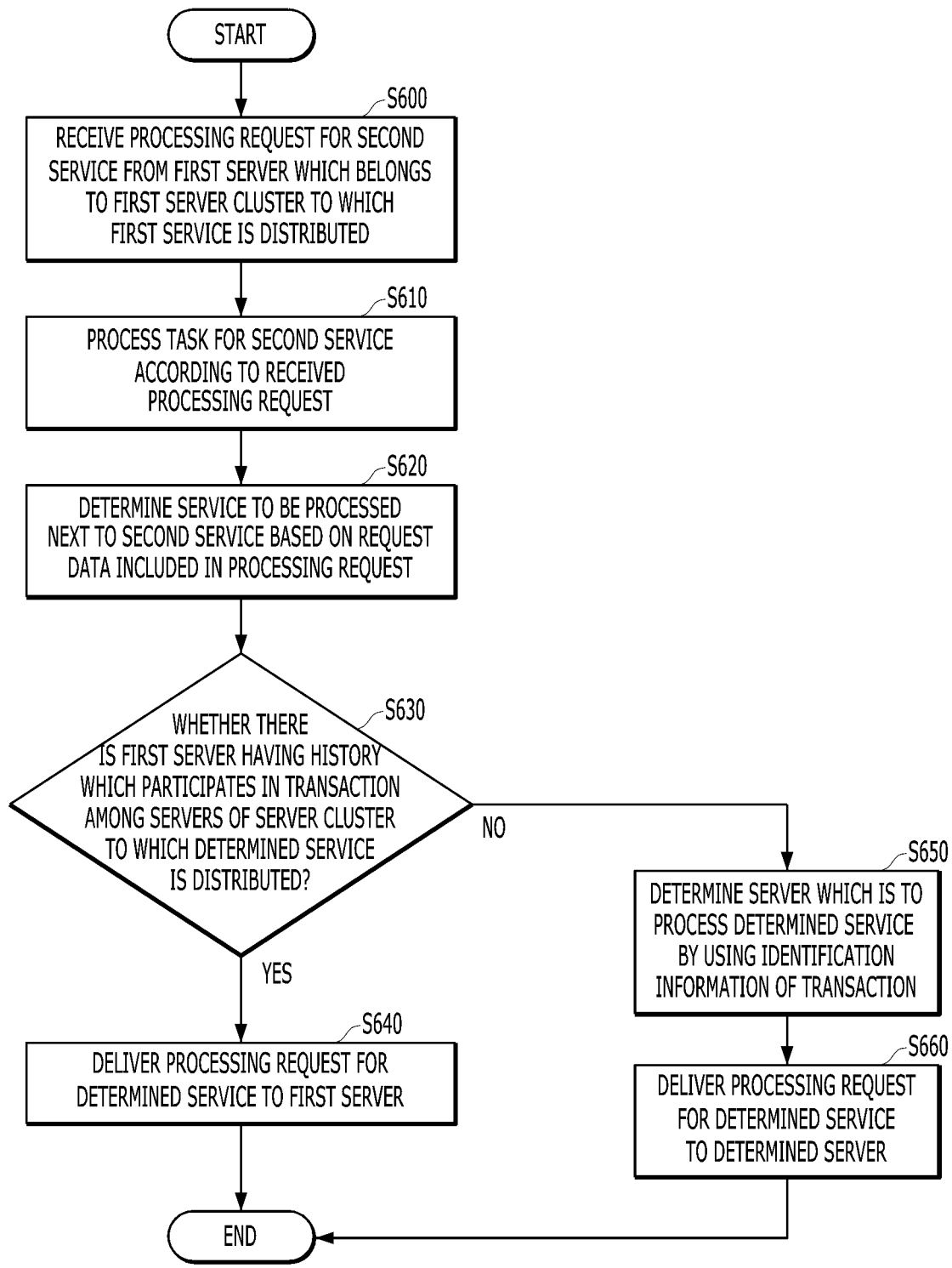
FIG. 6 is a flowchart for describing an example of a method for linking multiple services in a distributed server cluster system according to an exemplary embodiment of the present disclosure.

FIG. 6 is a flowchart for describing an example of a method for linking multiple services in a distributed server cluster system according to an exemplary embodiment of the present disclosure. In the presented exemplary embodiment, operations of FIG. 6 may be performed by the processor 330 of server B 300.

Referring to FIG. 6, the processor 330 receives a processing request for a second service from a first server of a first server cluster to which a first service is distributed (S600). The received processing request may include identification information of a transaction generated by the first server and request data received from a client device 10.

The processor 330 may process a task for the second service according to the received processing request (S610), and determines a service to be processed next to the second service based on the request data included in the processing request (S620). The request data may include a query statement for sequentially processing one or more services requested by the client device, and each server may sequentially perform a task according to a query statement (i.e., an SQL statement) for the service distributed to each server according to a corresponding query statement logic.

The processor 330 determines whether a first server having a history which participates in the transaction among servers of a server cluster to which the determined service is distributed (S630), and when there is the first server having the history which participates in the transaction, the processor 330 delivers a processing request for the determined service to the first server (S640). When there is no first server having the history which participates in the transaction, the processor 330 determines a server which is to process the determined service by using the identification information of the transaction (S650), and delivers the processing request for the determined service to the determined server (S660).

Hereinafter, a method for determining whether there is the first server having the history which participates in the transaction will be described in detail with reference to FIG. 7. In the presented exemplary embodiment, operations of FIG. 7 may be performed by the processor 330 of server B 300.

Figure 7:
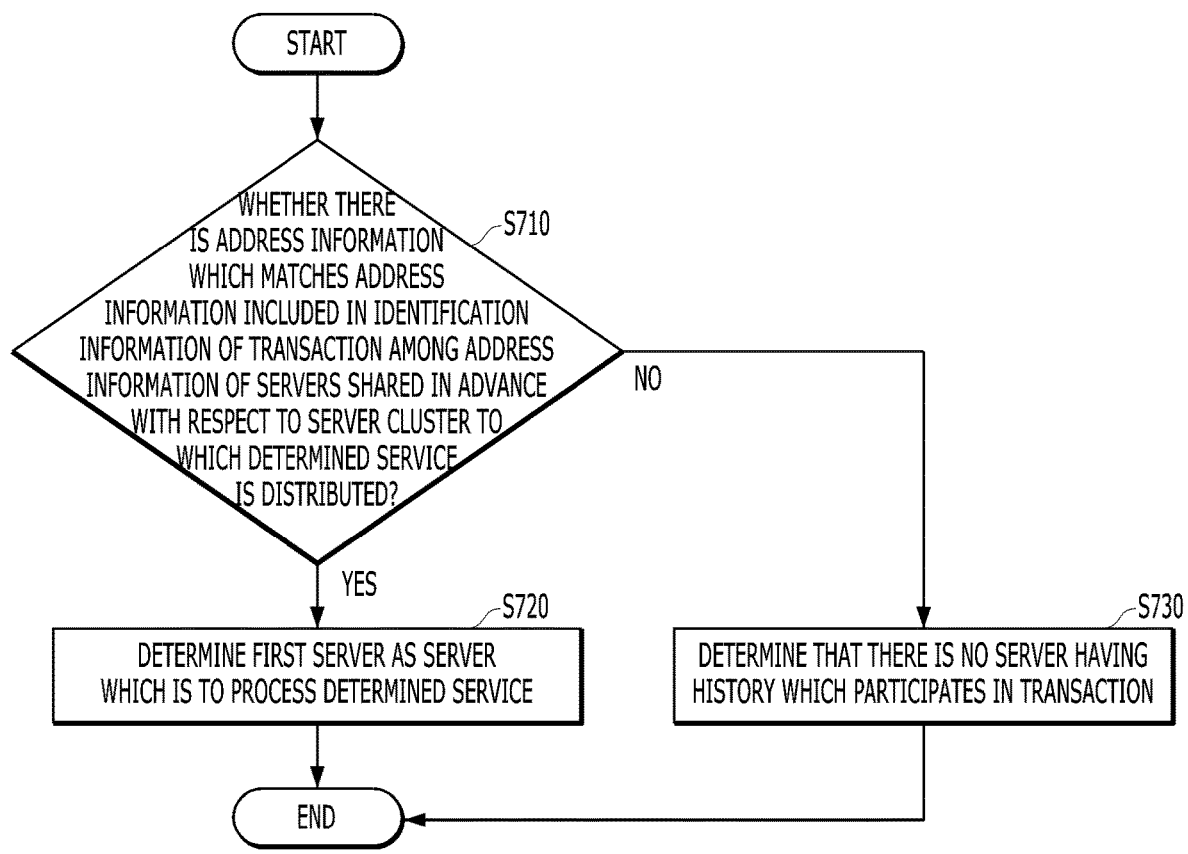
FIG. 7 is a flowchart for describing an example of a method for determining whether there is a first server having a history which participates in a transaction according to an exemplary embodiment of the present disclosure.

FIG. 7 is a flowchart for describing an example of a method for determining whether there is a first server having a history which participates in a transaction according to an exemplary embodiment of the present disclosure.

Referring to FIG. 7, the processor 330 determines whether there is address information which matches the address information (i.e., address information for the first server) included in the identification information of the transaction among the address information of the servers shared in advance with respect to the server cluster to which the determined service is distributed (S710). Address information of server clusters to which each service is distributed may be shared between respective server clusters at a time when each service is distributed.

When there is address information which matches the address information for the first server among the address information shared in advance, the processor 330 determines the first server as the server which is to process the determined service (S720).

When there is no address information which matches the address information for the first server among the address information shared in advance, the processor 330 may determine that there is no server having the history which participates in the transaction (S730), and operations for S650 and S660 of FIG. 6 described above.

Hereinafter, the method for determining the server which is to process the determined service by using the identification information of the transaction will be described in detail with reference to FIG. 8. In the presented exemplary embodiment, operations of FIG. 8 may be performed by the processor 230 of server A 200 or the processor 330 of server B 300.

Figure 8:
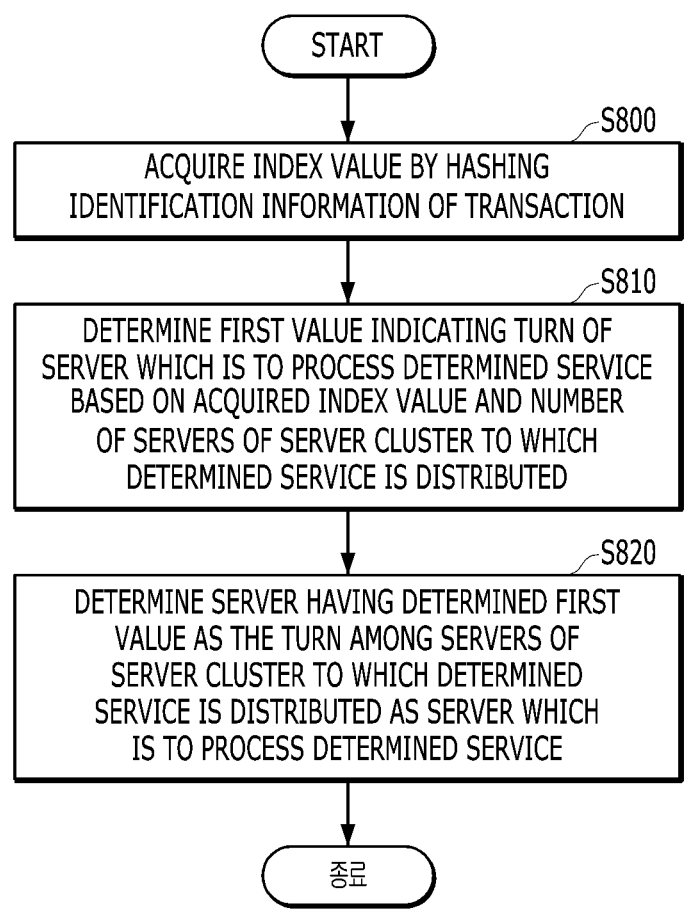
FIG. 8 is a flowchart for describing an example of the method for determining the server which is to process the determined service by using the identification information of the transaction according to an exemplary embodiment of the present disclosure.

FIG. 8 is a flowchart for describing an example of the method for determining the server which is to process the determined service by using the identification information of the transaction according to an exemplary embodiment of the present disclosure.

Referring to FIG. 8, the processor 230 acquires an index value by hashing the identification information of the transaction (S800). A hash function or a hash algorithm may be used in order to hash the identification information of the transaction. Here, the hash function or the hash algorithm may mean a function or an algorithm that maps (or outputs) data having any length to data having a fixed length. For example, the processor 230 may acquire an index value corresponding to an integer by hashing the identification information of the transaction by using the hash function or the hash algorithm.

The processor 230 determines a first value indicating a turn of the server which is to process the determined service based on the acquired index value and the number of servers of the server cluster to which the determined service is distributed (S810). Specifically, the processor 230 may acquire the first value by dividing the acquired index value by the number of servers. For example, a modulo operation may be used in order to acquire the first value, but is not limited thereto. With respect to each server, turns having different values may be allocated in advance for each server.

The processor 230 determines the server having the determined first value as turn among the servers of the server cluster to which the determined service is distributed as the server which is to process the determined service (S820). For example, it is assumed that the number of servers included in the server cluster to which the determined service is distributed is 3 and the first server among the corresponding servers has a turn of '0'. The processor 330 acquires an index value of '123' by hashing the transaction ID, and performs the modulo operation for the acquired '123' to acquire the remainder '0' acquired by dividing '123' by '3' as the first value. The processor 230 may determine the server having the turn of '0' among the corresponding servers as the server which is to process the determined service.

Hereinafter, exemplary scenarios of the method for linking multiple services in the distributed server cluster system will be described in more detail with reference to FIGS. 9 to 10.

Figure 9:
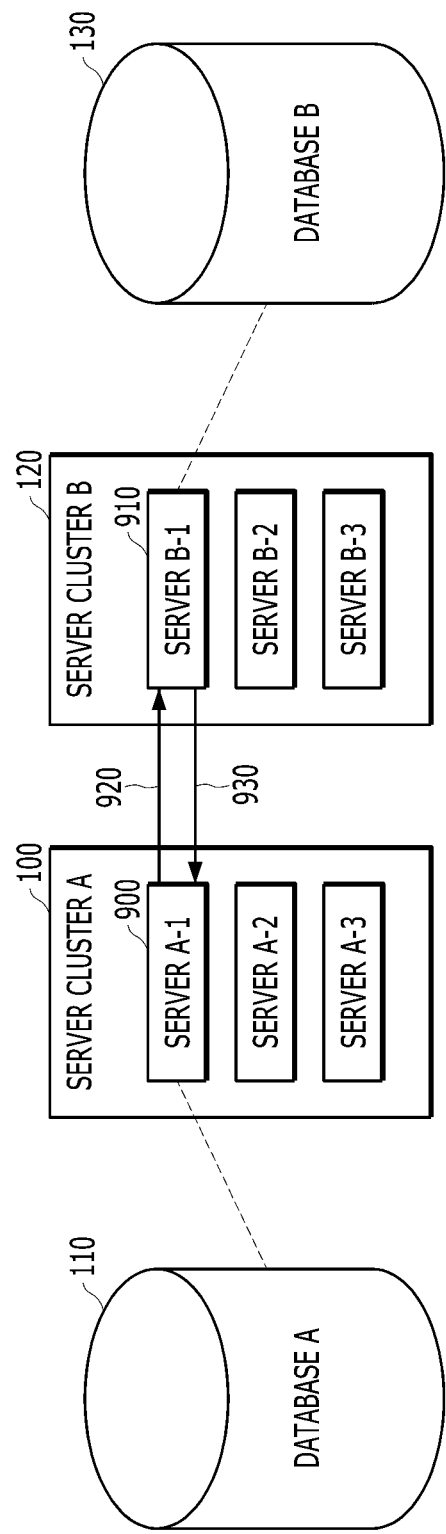
FIG. 9 is an exemplary diagram for describing an exemplary scenario of the method for linking multiple services in a distributed server cluster system according to an exemplary embodiment of the present disclosure.

FIG. 9 is an exemplary diagram for describing an exemplary scenario of the method for linking multiple services in a distributed server cluster system according to an exemplary embodiment of the present disclosure. In the presented exemplary embodiment, it is assumed that the first service and the third service are distributed to server cluster A 100, and the second service is distributed to server cluster B 120. Here, the first service may include a task that searches first data recorded in database A 110, the second service may include a task that searches second data recorded in database B 130, and the third service may include a task that reads the searched first data.

In the presented exemplary embodiment, a first scenario will be described in which server cluster A 100 processes the first service according to the request of the client device 10, delivers the processing request for the second service to server cluster B 120, and then server cluster B 120 processes the second service according to the request, and then delivers the processing request for the third service to server cluster A 100.

Referring to FIG. 9, server A-1 900 of server cluster A 100 may receive a request for one or more services from the client device 10. Here, the request may include request data including a query statement which allows each of the server cluster to which the first service is distributed, the server cluster to which the second service is distributed, and the server cluster to which the third service is distributed to sequentially process the first service, the second service, and the third service.

Server A-1 900 may generate a transaction (i.e., global transaction) for processing one or more services, and generate the ID for the generated transaction. Server A-1 900 may deliver a first notification message for notifying the start of the transaction to a plurality of server clusters including server cluster B. Through this, the servers of each server cluster may recognize a service request delivered forward as the task of the corresponding transaction.

Server A-1 900 may process the task for the first service according to the query statement logic, and determine a service to be processed next to the first service. For example, server A-1 900 may process a task which searches the first data in database A 110 by executing the query statement for the first service in the query statement logic, and determine the service to be processed next to the first service.

When the service to be processed next is the 'second service', server A-1 900 may determine whether there is a server having a history which participates in the transaction among the servers of server cluster B 120 to which the second service is distributed. Since server A-1 900 is a server that starts the transaction, the server having the history which participates in the transaction may not be present except for server A-1 900. In this case, server A-1 900 may determine a server which is to process the second service by using the transaction ID. Specifically, server A-1 900 may acquire the index value by hashing the transaction ID, and determine a first value indicating a turn of the server which is to process the second service by using the acquired index value. For example, server A-1 900 may determine a remainder value acquired by dividing the index value by '3' which is the number of servers included in server cluster B by using the modulo operation as the first value as described above.

When the sever having the first value as the turn is server B-1 910, server A-1 900 may call server B-1 910 to process the task for the second service (920). Server A-1 900 may deliver the transaction ID to server B-1 910 jointly with the request data at the time of calling the second service. The transaction ID may include address information of server A-1 900 as described above.

Server B-1 910 may process the task for the second service according to the call of server A-1 900, and determine the service to be processed next of the second service. For example, server B-1 910 may perform a task which searches the second data in database B 130 by executing the query statement for the second service in the query statement logic. When the second data is searched, server B-1 910 may determine the service to be processed next.

When the service to be processed next is the 'third service', server B-1 910 may determine whether there is the server having the history which participates in the transaction among the servers of server cluster A 100 to which the third service is distributed. Specifically, server B-1 910 may determine whether there is address information which matches the address information included in the transaction ID among the address information of the servers shared in advance with respect to server cluster A 100. The address information included in the transaction ID is address information of server A-1 900, and server A-1 900 has the history which participates in the transaction, so server B-1 910 may determine server A-1 900 as a server which is to process the third service.

Server B-1 910 may call server A-1 900 to process the task for the third service (930).

Server A-1 900 may process the task for the third service according to the call of server B-1 910. For example, server A-1 900 may perform a task which reads the first data searched in database A 110 by executing the query statement for the third service in the query statement logic.

When processing one or more services is completed, server A-1 900 may deliver a second notification message for notifying the end of the transaction to the servers of each server cluster. Server A-1 900 may perform a commit or rollback, and request the commit or rollback to at least one server which participates in the transaction. Through this, one or more servers which participate in the transaction simultaneously perform the commit or rollback to guarantee simultaneity and consistency for the transaction.

Figure 10:
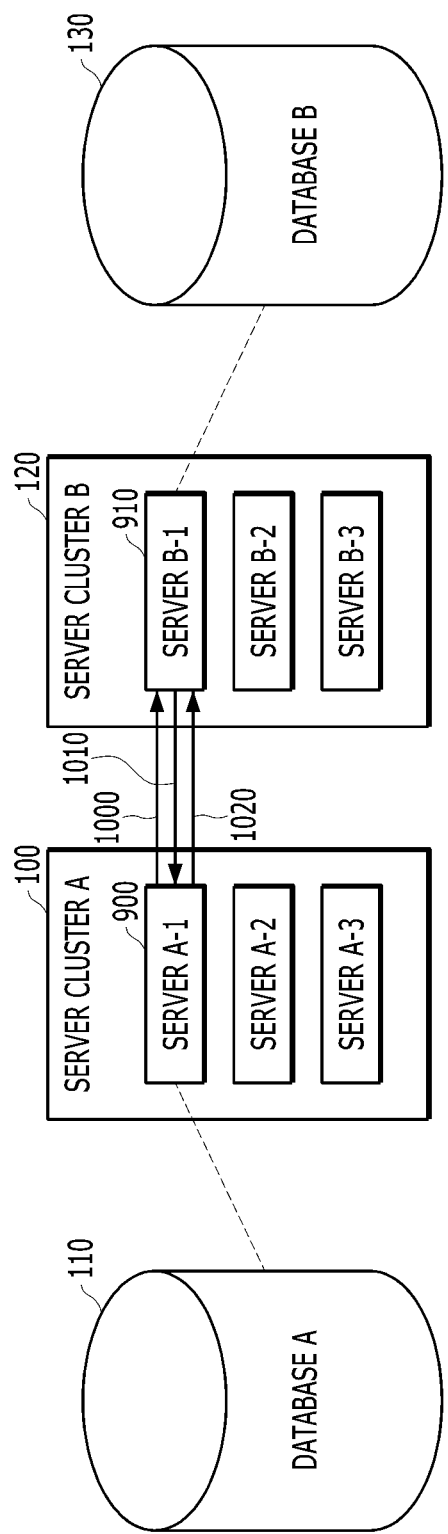
FIG. 10 is an exemplary diagram for describing an exemplary scenario of the method for linking multiple services in a distributed server cluster system according to another exemplary embodiment of the present disclosure.

FIG. 10 is an exemplary diagram for describing an exemplary scenario of the method for linking multiple services in a distributed server cluster system according to another exemplary embodiment of the present disclosure. In the presented exemplary embodiment, it is assumed that a fourth service and a sixth service are distributed to server cluster A 100, and a fifth service and a seventh service are distributed to server cluster B 120. Here, the fourth service may include a task that searches third data recorded in database A 110, and the fifth service may include a task that searches fourth data recorded in database B 130. Further, the sixth service may include a task which reads the searched third data, and the seventh service may include a task which reads the searched fourth data.

In the presented exemplary embodiment, a second scenario will be described in which server cluster A 100 processes the fourth service according to the request of the client device 10, delivers the processing request for the fifth service to server cluster B 120, and then server cluster B 120 processes the fifth service according to the request, and then delivers the request for the sixth service to server cluster A 100, and server cluster A 100 processes the sixth service according to the request, and then delivers a processing request for the seventh service to server cluster B 120. In other words, a scenario that delivers two or more service requests to the same server will be described.

Referring to FIG. 10, server A-1 900 of server cluster A 100 may generate a transaction and a transaction ID for processing one or more services.

Server A-1 900 may process a task for the fourth service according to the request of the client device 10, and determine a service to be processed next to the fourth service. For example, server A-1 900 may process a task which searches the third data in database A 110 by executing the query statement for the fourth service in the query statement logic, and determine a service to be processed next to the fourth service.

When the service to be processed next is the 'fifth service', server A-1 900 may determine a server which is to process the fifth service among the servers of server cluster B 120 to which the fifth service is distributed by using the transaction ID. Since server A-1 900 is a server that starts the transaction, the server having the history which participates in the transaction may not be present except for server A-1 900.

In this case, server A-1 900 may acquire the index value of the integer by hashing the transaction ID, and determine a second value indicating a turn of the server which is to process the fifth service by using the acquired index value.

When the sever having the second value as the turn is server B-1 910, server A-1 900 may call server B-1 910 to process the task for the fifth service (1000). Server A-1 900 may deliver the transaction ID to server B-1 910 jointly with the request data (i.e., query statement) at the time of calling server B-1 910. The transaction ID may include address information of server A-1 900 as described above.

Server B-1 910 may process the task for the fifth service according to the call of server A-1 900, and determine the service to be processed next of the fifth service. For example, server B-1 910 may process a task which searches the fourth data in database B 130 by executing the query statement for the fifth service in the query statement logic, and determine the service to be processed next to the fifth service.

When the service to be processed next is the 'sixth service', server B-1 910 may determine whether there is the server having the history which participates in the transaction among the servers of server cluster A 100 to which the sixth service is distributed. Specifically, server B-1 910 may determine whether there is address information which matches the address information included in the transaction ID among the address information of the servers shared in advance with respect to server cluster A 100. Since the address information included in the transaction ID is address information of server A-1 900, server B-1 910 may determine server A-1 900 having the history which participates in the transaction as a server which is to process the sixth service.

Server B-1 910 may call server A-1 900 to process the task for the sixth service (1010).

Server A-1 900 may process the task for the sixth service according to the call of server B-1 910. For example, server A-1 900 may process a task which reads the third data searched in database A 110 by executing the query statement for the sixth service in the query statement logic, and determine a service to be processed next to the sixth service.

When the service to be processed next is the 'seventh service', server A-1 900 may determine a server which is to process the seventh service among the servers of server cluster B 120 to which the seventh service is distributed. In order to determine the server which is to process the seventh service, server A-1 900 may determine whether there is the server having the history which participates in the transaction among the servers of server cluster B 120.

Specifically, server A-1 900 may determine whether there is a server having address information which matches address information included in the transaction ID among addresses of the servers of server cluster B 120 to which the seventh service is distributed. Since the address information included in the transaction ID is the address information of server A-1 900, may not be present the server having the address information which matches the address information included in the transaction ID in server cluster B 120 to which the seventh service is distributed.

Meanwhile, since the fifth service and the seventh service are distributed to server cluster B 120, there may be server B-1 910 having the history which participates in the transaction by processing the task for the 'fifth service'.

When the server having the address information which matches the address information included in the transaction ID is not present, server A-1 900 may use the transaction ID in order to determine the server which is to process the seventh service. Specifically, server A-1 900 may acquire the index value of the integer by hashing the transaction ID, and determine a third value indicating a turn of the server which is to process the seventh service by computing the acquired index value. Since the transaction ID is a value uniquely maintained in the corresponding transaction, the index value acquired by hashing the transaction ID by server A-1 900 may be equal to the index value acquired to determine the server which is to process the fifth service. That is, the third value determined by using the index value may be a value equal to the second value determined above. Therefore, the server having the third value as the turn may be server B-1 910.

Server A-1 900 may call server B-1 910 that processed the fifth service to process the task for the seventh service (1020).

Server B-1 910 may process the task for the seventh service according to the call of server A-1 900. For example, server B-1 910 may process a task which reads the fourth data searched in database B 130 by executing the query statement for the seventh service in the query statement logic.

As such, when server A-1 900 delivers the processing request for the 'seventh service' to server B-1 910 having the history which participates in the transaction, server B-1 910 which already performs the session-connection to database B 130 processes the task for the seventh service, the resources required for processing the transaction may be minimized.

Hereinafter, the method for linking multiple services in the distributed server cluster system according to a request for remitting a first money amount from bank A to bank B by a user will be described exemplarily with reference to FIG. 11.

Figure 11:
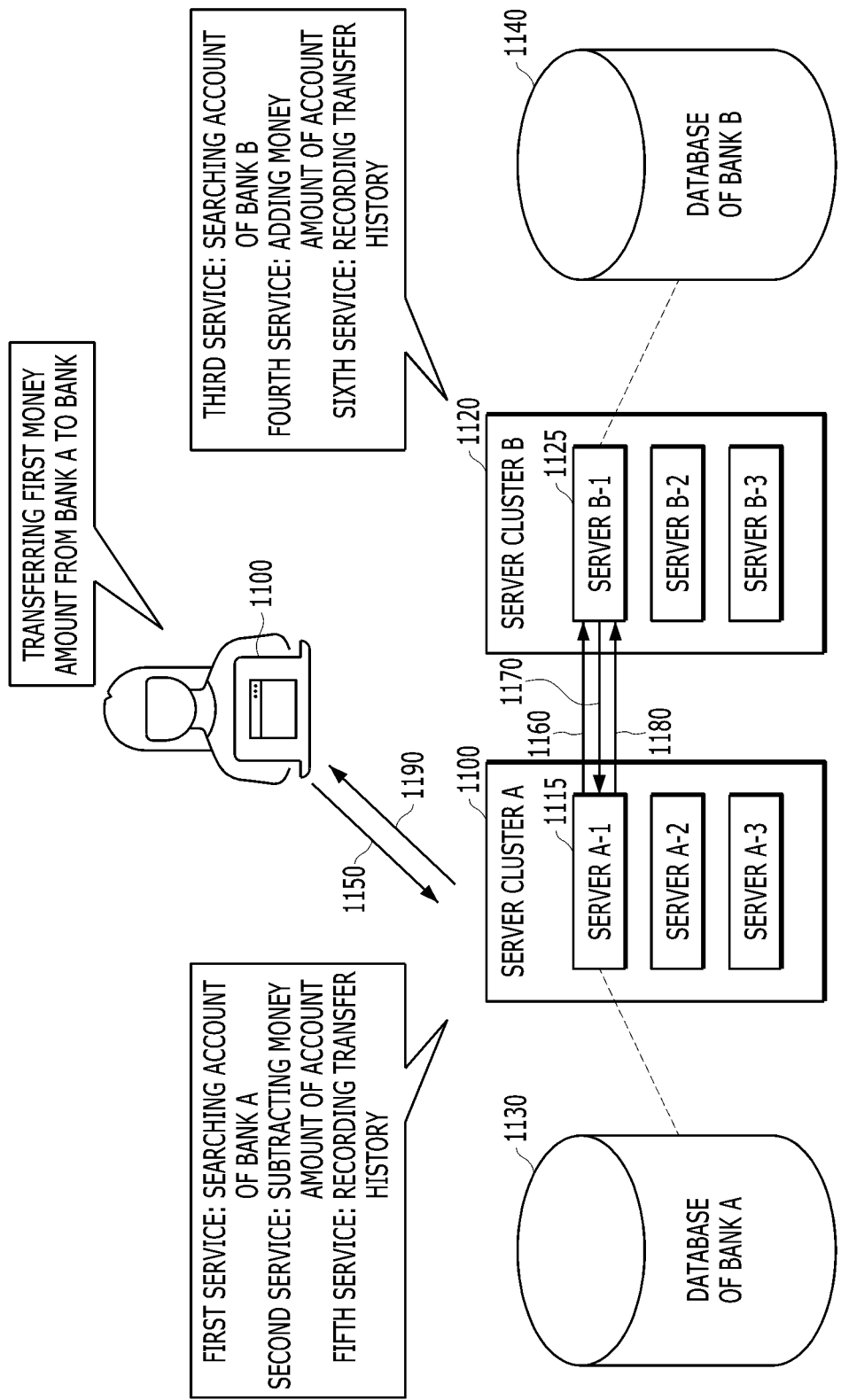
FIG. 11 is an exemplary diagram for describing a method for linking multiple services in the distributed server cluster system according to a request for transferring a first money amount from bank A to bank B by a user according to an exemplary embodiment of the present disclosure.

FIG. 11 is an exemplary diagram for describing a method for linking multiple services in the distributed server cluster system according to a request for transferring a first money amount from bank A to bank B by a user according to an exemplary embodiment of the present disclosure. In the presented exemplary embodiment, an exemplary scenario will be described in which the user transfers the first money amount from bank A of the user to bank B of the user.

Referring to FIG. 11, the distributed server cluster system may include a client device 1100 of the user, server cluster A 1110 of bank A, server cluster B 1120 of bank B, a database 1130 of bank A, and database 1140 of bank B. Here, the database 1130 of bank A may include account information of bank A and money amount information of each account. The database 1140 of bank B may include the account information of bank B and the money amount information of each account.

The client device 1100 may access a webpage for a bank business through a web browser in order to request transferring a first money amount from bank A to bank B. When there is the request from the user for transferring the first money amount from bank A to bank B, the client device 1100 may deliver a service request including a query statement for transferring the first money amount from bank A to bank B to server A-1 1115 which belongs to server cluster A 1110 of bank A (1150). The corresponding query statement may include a withdrawal UPDATE statement for subtracting the first money amount from an account of bank A of the user, a deposit UPDATE statement for adding the first money amount in the account of bank B of the user, a recording UPDATE statement for recording a transfer history between bank A and bank B. The withdrawal UPDATE statement may include an UPDATE statement for searching the account of bank A in the database 1130 of bank A, and subtracting the first money amount from the searched account of bank A. The deposit UPDATE statement may include an UPDATE statement for searching the account of bank B in the database 1140 of bank B, and adding the first money amount to the searched account of bank B. The recording UPDATE statement may include an UPDATE statement for recording the history of transferring the first money amount from the account of bank A to the account of bank B in the database 1130 of bank A, and recording the transfer history in the database 1140 of bank B.

A first service of searching the account of bank A, a second service of subtracting the first money amount from the account of bank A, and a fifth service of recording the transfer history may be distributed to server cluster A 1110 of bank A, and a third service of searching the account of bank B, a fourth service of adding the first money amount in the account of bank B, and a sixth service of recording the transfer history may be distributed to server cluster B 1120 of bank B.

Server A-1 1115 which receives the service request may generate a transaction for processing one or more services according to the query statement for transferring the first money amount from bank A to bank B of the user, and deliver a first notification message for notifying the start of the transaction to each server cluster. Server A-1 1115 may generate the transaction ID at the time of generating the transaction, and address information of server A-1 1115 may be included in the generated transaction ID.

Server A-1 1115 may sequentially process the tasks for the first service and the second service according to the query statement, and determine a service (i.e., the third service and the fourth service) to be processed next. For example, server A-1 1115 may process a task of searching the account of the user for bank A in the database 1130 of bank A by performing the session connection to the database 1130 of bank A, and subtracting the first money amount from the searched account.

Server A-1 1115 may determine a server which is to process the third service and the fourth service among servers of server cluster B 1120 of bank B to which the determined third and fourth services is distributed. Specifically, server A-1 1115 may determine whether there is a server having a history which participates in the transaction among the servers of server cluster B 1120 of bank B. To this end, server A-1 1115 may determine whether there is address information which matches the address information included in the transaction ID among the address information of the servers shared in advance with respect to server cluster B 1120 of bank B.

Since server A-1 1115 is a server that starts the transaction, the server which participates in the transaction may not be present except for server A-1 1115. In other words, there may be no server having the address information which matches the address information included in the transaction ID in server cluster B 1120 of bank B.

In this case, server A-1 1115 may determine the server which is to process the third service and the fourth service by using the transaction ID. Specifically, server A-1 1115 may acquire an index value of an integer by hashing the transaction ID, and acquire a first value (i.e., a first value at a first time) indicating the turn of any one server which is to process the third service and the fourth service among the servers included in server cluster B 1120 of bank B by computing the acquired index value through the modulo operation. When the server of bank B having the first value as the turn is server B-1 1125, server A-1 1115 may determine server B-1 1125 as the server which is to process the third service and the fourth service, and call server B-1 1125 to process the tasks for the third service and the fourth service (1160). Server A-1 1115 may deliver the query statement and the transaction ID to server B-1 1125 at the time of calling server B-1 1125.

Server B-1 1125 may sequentially process the tasks for the third service and the fourth service according to the query statement, and determine a service (i.e., the fifth service) to be processed next. For example, server B-1 1125 may process a task of searching the account of the user for bank B in the database 1140 of bank B by performing the session connection to the database 1140 of bank B, and adding the first money amount in the searched account.

Server B-1 1125 may determine the server which is to process the fifth service among the servers of server cluster A 1110 of bank A to which the determined fifth service is distributed.

In order to determine the server which is to process the fifth service, server B-1 1125 may determine whether there is the server having the history which participates in the transaction among the servers of server cluster A 1110 of bank A by using the transaction ID.

Specifically, server B-1 1125 may determine whether there is address information which matches the address information included in the transaction ID among the address information of the servers shared in advance with respect to server cluster A 1110 of bank A. Since the address information included in the transaction ID is the address information of server A-1 1115, there is server A-1 1115 having the history which participates in the transaction in server cluster A 1110 of bank A.

Server B-1 1125 may determine server A-1 1115 having the history which participates in the transaction as the server which is to process the fifth service, and call server A-1 1115 to process the task for the fifth service (1170).

Server A-1 1115 may process the task for the fifth service according to the query statement, and determine a service (i.e., the sixth service) to be processed next. For example, server A-1 1115 may process a task of recording a history in which the first money amount is transferred from the account of bank A to the account of bank B through a session already connected to the database 1130 of bank A in the database 1130 of bank A.

Server A-1 1115 may determine the server which is to process the sixth service among the servers of server cluster B 1120 of bank B to which the determined sixth service is distributed.

In order to determine the server which is to process the sixth service, server A-1 1115 may determine whether there is the server having the history which participates in the transaction among the servers of server cluster B 1120 of bank B by using the transaction ID.

Specifically, server A-1 1115 may determine whether there is address information which matches the address information included in the transaction ID among the address information of the servers shared in advance with respect to server cluster B 1110 of bank B. Since the address information included in the transaction ID is the address information of server A-1 1115, there may be no address information which matches the address information included in the transaction ID among the address information of the servers shared in advance with respect to server cluster B 1110 of bank B. Therefore, server A-1 1115 may acquire an index value of an integer by hashing the transaction ID, and acquire a first value (i.e., a first value at a second time) indicating the turn of server B-1 1125 having the history which is participates in the transaction among the servers included in server cluster B 1120 of bank B by computing the acquired index value through the modulo operation. Since the transaction ID is information which is not changed in the transaction, and the acquired index value is the same as the index values acquired to determine the servers which are to process the third service and the fourth service, the first value at the second time may be the same as the first value at the first time. Therefore, server B-1 1125 having the history which participates in the transaction may be selected again.

Server A-1 1115 may determine server B-1 1125 having the acquired first value as the turn as a server which is to process the sixth service, and call server B-1 1125 to process the task for the sixth service (1180).

Server B-1 1125 may process the task for the sixth service according to the query statement. For example, server B-1 1125 may process a task of recording a history in which the first money amount is transferred from the account of bank A to the account of bank B through a session already connected to the database 1140 of bank B in the database 1140 of bank B.

When the tasks for one or more services are completed according to the query statement, server A-1 1115 may deliver a second notification message for notifying the end of the transaction to each server cluster, and request a commit or rollback to each server cluster so that each server cluster which participates in the transaction performs the commit or rollback.

Server A-1 1115 may perform the commit or rollback, and deliver a service response representing processing completion for one or more services to the client device 1100 (1190). The client device 1100 that receives the service response may provide a webpage showing a result of transferring the first money amount from bank A to bank B on a screen.

In the presented exemplary embodiment, the method for linking multiple services between two server clusters is described, but if the present disclosure is not limited thereto, the schemes of the present disclosure may be used even in linking multiple services between two or more server clusters.

As such, in the present disclosure, one server among the servers to which the respective services are distributed processes a service task in one transaction, so the number of servers connecting the session to the database is reduced and a usage amount of the DB session is decreased, and as a result, a DB availability increases. Further, in the present disclosure, the number of servers in which the service is linked in order to process the transaction is reduced in the global transaction to reduce a communication amount between the servers for linking the service, thereby enhancing a transaction processing speed.

Figure 12:
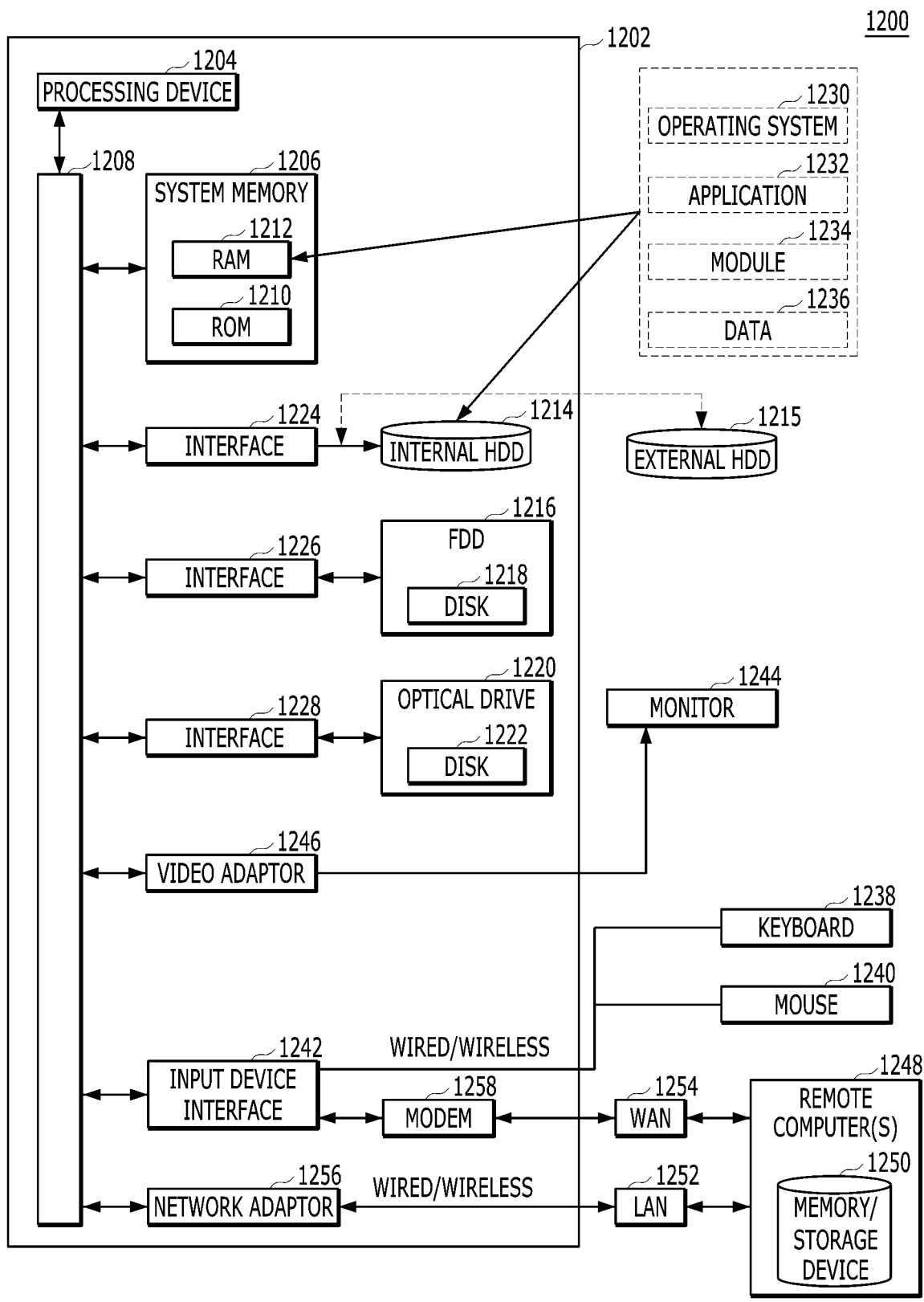
FIG. 12 is a simple and general schematic diagram illustrating an example of a computing environment in which the embodiments of the present disclosure are implementable.

FIG. 12 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a minicomputer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1200 including a computer 1202 and implementing several aspects of the present disclosure is illustrated, and the computer 1202 includes a processing device 1204, a system memory 1206, and a system bus 1208. The system bus 1208 connects system components including the system memory 1206 (not limited) to the processing device 1204. The processing device 1204 may be a predetermined processor among various commonly used processors. A dual processor and other multi-processor architectures may also be used as the processing device 1204.

The system bus 1208 may be a predetermined one among several types of bus structure, which may be additionally connectable to a local bus using a predetermined one among a memory bus, a peripheral device bus, and various common bus architectures. The system memory 1206 includes a ROM 1210, and a RAM 1212. A basic input/output system (BIOS) is stored in a non-volatile memory 1210, such as a ROM, an EPROM, and an EEPROM, and the BIOS includes a basic routing helping a transport of information among the constituent elements within the computer 1202 at a time, such as starting. The RAM 1212 may also include a high-rate RAM, such as a static RAM, for caching data.

The computer 1202 also includes an embedded hard disk drive (HDD) 1214 (for example, enhanced integrated drive electronics (EIDE) and serial advanced technology attachment (SATA))—the embedded HDD 1214 being configured for exterior mounted usage within a proper chassis (not illustrated)—a magnetic floppy disk drive (FDD) 1216 (for example, which is for reading data from a portable diskette 1218 or recording data in the portable diskette 1218), and an optical disk drive 1220 (for example, which is for reading a CD-ROM disk 1222, or reading data from other high-capacity optical media, such as a DVD, or recording data in the high-capacity optical media). A hard disk drive 1214, a magnetic disk drive 1216, and an optical disk drive 1220 may be connected to a system bus 1208 by a hard disk drive interface 1224, a magnetic disk drive interface 1226, and an optical drive interface 1228, respectively. An interface 1224 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1202, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1230, one or more application programs 1232, other program modules 1234, and program data 1236 may be stored in the drive and the RAM 1212. An entirety or a part of the operation system, the application, the module, and/or data may also be cached in the RAM 1212. It will be well appreciated that the present disclosure may be implemented by several commercially usable operation systems or a combination of operation systems.

A user may input a command and information to the computer 1202 through one or more wired/wireless input devices, for example, a keyboard 1238 and a pointing device, such as a mouse 1240. Other input devices (not illustrated) may be a microphone, an IR remote controller, a joystick, a game pad, a stylus pen, a touch screen, and the like. The foregoing and other input devices are frequently connected to the processing device 1204 through an input device interface 1242 connected to the system bus 1208, but may be connected by other interfaces, such as a parallel port, an IEEE 1394 serial port, a game port, a USB port, an IR interface, and other interfaces.

A monitor 1244 or other types of display devices are also connected to the system bus 1208 through an interface, such as a video adaptor 1246. In addition to the monitor 1244, the computer generally includes other peripheral output devices (not illustrated), such as a speaker and a printer.

The computer 1202 may be operated in a networked environment by using a logical connection to one or more remote computers, such as remote computer(s) 1248, through wired and/or wireless communication. The remote computer(s) 1248 may be a work station, a computing device computer, a router, a personal computer, a portable computer, a microprocessor-based entertainment device, a peer device, and other general network nodes, and generally includes some or an entirety of the constituent elements described for the computer 1202, but only a memory storage device 1250 is illustrated for simplicity. The illustrated logical connection includes a wired/wireless connection to a local area network (LAN) 1252 and/or a larger network, for example, a wide area network (WAN) 1254. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1202 is used in the LAN networking environment, the computer 1202 is connected to the local network 1252 through a wired and/or wireless communication network interface or an adaptor 1256. The adaptor 1256 may make wired or wireless communication to the LAN 1252 easy, and the LAN 1252 also includes a wireless access point installed therein for the communication with the wireless adaptor 1256. When the computer 1202 is used in the WAN networking environment, the computer 1202 may include a modem 1258, is connected to a communication computing device on a WAN 1254, or includes other means setting communication through the WAN 1254 via the Internet. The modem 1258, which may be an embedded or outer-mounted and wired or wireless device, is connected to the system bus 1208 through a serial port interface 1242. In the networked environment, the program modules described for the computer 1202 or some of the program modules may be stored in a remote memory/storage device 1250. The illustrated network connection is illustrative, and those skilled in the art will appreciate well that other means setting a communication link between the computers may be used.

The computer 1202 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method for linking multiple services in a distributed server cluster system, which is performed by a first computing device, the method comprising:
    receiving a processing request for a second service from a first server which belongs to a first server cluster to which a first service is distributed, wherein the processing request includes identification information for a transaction generated by the first server and request data for processing one or more services according to a request of a client device;
    processing a task for the second service according to the received processing request;
    determining a service to be processed next to the second service based on the request data;
    determining whether there is the first server having a history which participates in the transaction among servers of a server cluster to which the determined service is distributed;
    delivering the processing request for the determined service to the first server when there is the first server having the history which participates in the transaction; and
    determining a server which is to process the determined service by using the identification information of the transaction when the first server having the history which participates in the transaction is not present, sand delivering the processing request for the determined service to the determined server.

2. The method of claim 1, wherein the first server is a server that receives requests for the one or more services from the client device, starts the transaction, and generates the identification information of the transaction.

3. The method of claim 1, wherein the request data includes a query statement for sequentially processing the one or more services, and
    the determining of the service to be processed next to the second service based on the request data is
    determining the service to be processed next to the second service by using the query statement.

4. The method of claim 1, wherein when the transaction is generated by the first server, detailed information for the servers which belong to one or more server clusters to which the one or more services are distributed is shared through the first server, and
    the detailed information includes address information for the servers which belong to the one or more server clusters.

5. The method of claim 4, wherein the identification information of the transaction includes the address information for the first server, and
    the determining of whether there is the first server having the history which participates in the transaction among the servers of the server cluster to which the determined service is distributed includes
    determining whether there is address information which matches the address information for the first server among the address information for the servers which belong to the one or more server clusters, and
    determining the first server as a server which is to process the second service when there is the address information which matches the address information for the first server.

6. The method of claim 5, further comprising:
    determining that the first server having the history which participates in the transaction is not present when there is no address information which matches the address information for the first server.

7. The method of claim 1, wherein the determining of the server which is to process the determined service by using the identification information of the transaction includes
    acquiring an index value by hashing the identification information of the transaction,
    determining a first value indicating a turn of the server which is to process the determined service based on the acquired index value and the number of servers which belong to the server cluster to which the determined service is distributed, and determining a server having the first value as a turn among the servers which belong to the server cluster to which the determined service is distributed as the server which is to process the determined service.

8. A method for linking multiple services in a distributed server cluster system, which is performed by a second computing device, the method comprising:
receiving requests for one or more services from a client device, wherein the request includes request data for processing the one or more services;
processing a first service distributed to the second computing device according to the received request by generating a transaction for processing the one or more services, wherein identification information for the generated transaction is generated after generating the transaction, and address information of the second computing device is made to be included in the generated identification information;
determining a service to be processed next to the processed first service based on the request data; and
delivering a processing request for the determined service to a second server having a history which participates in the transaction among servers of a server cluster to which the determined service is distributed.

9. The method of claim 8, wherein the request data includes a query statement for sequentially processing the one or more services, and
the determining of the service to be processed next to the first service based on the request data is
determining the service to be processed next to the first service by using the query statement.

10. The method of claim 8, wherein the delivering of the processing request for the determined service to the second server having the history which participates in the transaction among the servers of the server cluster to which the determined service is distributed includes
acquiring an index value by hashing the identification information of the transaction,
determining a first value indicating a turn of the server which is to process the determined service based on the acquired index value and the number of servers which belong to the server cluster to which the determined service is distributed, and
delivering a processing request for the determined service to a server having the first value as a turn among the servers which belong to the server cluster to which the determined service is distributed.

11. The method of claim 10, wherein the processing request includes the request data and the identification information of the transaction including the address information of the second computing device.

12. A non-transitory computer-readable storage medium comprising a computer program, wherein the computer program executes the following operations for linking multiple services in a distributed server cluster system when the computer program is executed by one or more processors, the operations comprising:

an operation of receiving a processing request for a second service from a first server which belongs to a first server cluster to which a first service is distributed, wherein the processing request includes identification information for a transaction generated by the first server and request data for processing one or more services according to a request of a client device;
an operation of processing a task for the second service according to the received processing request;
an operation of determining a service to be processed next to the processed second service based on the request data;
an operation of determining whether there is the first server having a history which participates in the transaction among servers of a server cluster to which the determined service is distributed;
an operation of delivering the processing request for the determined service to the first server when there is the first server having the history which participates in the transaction; and
an operation of determining a server which is to process the determined service by using the identification information of the transaction when the first server having the history which participates in the transaction is not present, sand delivering the processing request for the determined service to the determined server.

13. A computing device for linking multiple services in a distributed server cluster system, comprising:
at least one processor; and
a memory,
wherein at least one processor is configured to
receive a processing request for a second service from a first server which belongs to a first server cluster to which a first service is distributed, wherein the processing request includes identification information for a transaction generated by the first server and request data for processing one or more services according to a request of a client device,
process a task for the second service according to the received processing request,
determine a service to be processed next to the processed second service based on the request data,
determine whether there is the first server having a history which participates in the transaction among the servers of the server cluster to which the determined service is distributed,
deliver the processing request for the determined service to the first server when there is the first server having the history which participates in the transaction, and
determine a server which is to process the determined service by using the identification information of the transaction when the first server having the history which participates in the transaction is not present, sand delivering the processing request for the determined service to the determined server.

* * * * *